(12) United States Patent
Takai (10) Patent No.: US 9,016,728 B2
(45) Date of Patent: Apr. 28, 2015

(54) CONNECTOR

(75) Inventor: Motoharu Takai, Fujisawa (JP)

(73) Assignee: NIFCO Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 14/116,214

(22) PCT Filed: May 10, 2012

(86) PCT No.: PCT/JP2012/062034
§ 371 (c)(1),
(2), (4) Date: Dec. 16, 2013

(87) PCT Pub. No.: WO2012/153811
PCT Pub. Date: Nov. 15, 2012

(65) Prior Publication Data
US 2014/0103639 A1    Apr. 17, 2014

(30) Foreign Application Priority Data

May 12, 2011   (JP) ................................. 2011-106902

(51) Int. Cl.
*F16L 47/04* (2006.01)
*F16L 33/22* (2006.01)
*B60S 1/48* (2006.01)

(52) U.S. Cl.
CPC ............... *F16L 33/22* (2013.01); *F16L 33/227* (2013.01); *F16L 33/225* (2013.01); *F16L 47/04* (2013.01); *B60S 1/48* (2013.01)

(58) Field of Classification Search
USPC ......... 285/307, 23, 83, 315, 316, 84–86, 314, 285/321, 243, 322, 323
See application file for complete search history.

(56) References Cited

U.S. PATENT DOCUMENTS

| 5,102,170 A | * | 4/1992 | Inoue ............................. 285/23 |
| 6,416,085 B1 | * | 7/2002 | Markovic ...................... 285/102 |
| 7,900,973 B2 | * | 3/2011 | Herberg et al. ............... 285/331 |

FOREIGN PATENT DOCUMENTS

| CN | 87211263 U | 6/1988 |
| CN | 201386876 Y | 1/2010 |
| JP | H03-77893 U | 8/1991 |
| JP | H07-151282 A | 6/1995 |
| JP | H09-42560 A | 2/1997 |
| JP | 2000-170976 A | 6/2000 |
| JP | 2001-021087 A | 1/2001 |
| JP | 2006-220186 A | 8/2006 |

OTHER PUBLICATIONS

PCT, "International Search Report for PCT/JP2012/062034".

* cited by examiner

*Primary Examiner* — Michael P Ferguson
*Assistant Examiner* — Jay R Ripley
(74) *Attorney, Agent, or Firm* — Manabu Kanesaka (57) ABSTRACT

A connector includes a connector main body having a mounting tube for mounting a hose; and a lock member loosely fitted in a guide member of the connector main body slidably in an axis line direction. The lock member includes a claw member provided to stand from an inner wall face in a mounted hose direction facing thereto. The mounting tube includes a projecting piece on an outer end circumference. After the hose has been inserted into the mounting tube, if the hose or the lock member is pulled, the lock member moves forward, so that the hose is locked by the claw member, and the hose is clamped by the projecting piece provided on a mounting tube side and the lock member. As a result, the hose can be easily connected, and a high sealing property can be obtained.

5 Claims, 11 Drawing Sheets

CONNECTOR

RELATED APPLICATIONS

The present application is National Phase of International Application No. PCT/JP2012/062034 filed May 10,2012, and claims priority from Japanese Application No. 2011-106902, filed May 12,2011.

FIELD OF TECHNOLOGY

The present invention relates to a connector which can connect a hose swiftly and reliably, and a connector used for, for example, a hose for a headlamp washer of an automobile and the like.

BACKGROUND ART

Conventionally, for example, the hose has been mounted in a connection tube, and has been tightened from an outer circumference thereof by a fastener band so as to be retained and to prevent a water leak. Also, as shown in Patent Document 1, an inner circumferential face of an annular concave portion provided in an inner circumferential face of a receiving opening of a connector main body includes an inclined inner circumferential face whose diameter is reduced toward an opening end side. In the annular concave portion, there is disposed a short cylinder portion of a collet including a flange in one end of the short cylinder portion in a loosely fitted state. In an inner side of the collet, there is disposed a small-diameter short cylinder portion which is provided to extend integrally in the opening end side from a back-portion inner circumferential face of the connector main body concentrically with a shaft center of the connector main body. In an annular groove provided in an outer circumferential face of the short cylinder portion, there is mounted a seal ring.

PRIOR ART DOCUMENTS

Patent Documents

Patent Document 1: Japanese Unexamined Patent Application Publication No. 2001-21087

DISCLOSURE OF THE INVENTION

Problems to be Solved by the Invention

In a case wherein the conventional fastener band with the aforementioned configuration is used, however, workability was bad, and there was a disadvantage of requiring time for a fixation of the hose. Also, it was necessary to make sure whether or not the fastener band had been reliably mounted. Moreover, in the configuration shown in the Patent Document 1, depending on a type of the hose used or a height of an inner pressure, there was a problem that the seal ring alone was not enough for a waterproof property.

The present invention is made in order to solve the aforementioned disadvantage, and provides a connector which can realize a high sealing performance.

Means for Solving the Problems

A connector of the present invention comprises a connector main body including a mounting tube for mounting a hose; and a lock member loosely fitted in a guide member of the connector main body slidably in an axis line direction. The lock member includes a claw member provided to stand in an inner wall face, and the mounting tube includes a projecting piece on an outer end circumference. After the hose has been inserted into the aforementioned mounting tube, the hose or the lock member is pulled to move the lock member forward, so that the hose is locked by the claw member, and the hose is clamped by the projecting piece provided on a mounting tube side and the lock member.

In the connector of the present invention, preferably, the lock member includes a projecting piece in the inner wall face, and the hose is disposed between the projecting piece on the outer circumference of the aforementioned mounting tube and the projecting piece of an inner wall of the lock member so as to prevent a positional misalignment of the lock member. According to the preferred aspect, the lock member controls a forward movement and a backward movement of the lock member, so that a position of the lock member will never be misaligned so as to maintain a high sealing property.

In the connector of the present invention, preferably, the mounting tube includes a plurality of projecting pieces on the outer circumference of the end, and the projecting piece formed on the inner wall of an end of the lock member is positioned between the plurality of projecting pieces so as to clamp and fix the hose. According to the preferred aspect, even if the hose receives a high inner pressure, a sealing property can be ensured.

In the connector of the present invention, preferably, the lock member includes a locking protrusion on an outer circumference, and the locking protrusion is held at a locked portion of the guide member so as to prevent the positional misalignment of the lock member. According to the preferred aspect, the high sealing property can be maintained.

Effect of the Invention

According to the present invention, connection operation of the hose can be easily and reliably carried out, and the high sealing property can be obtained.

BEST MODES OF CARRYING OUT THE INVENTION

Figure 1:
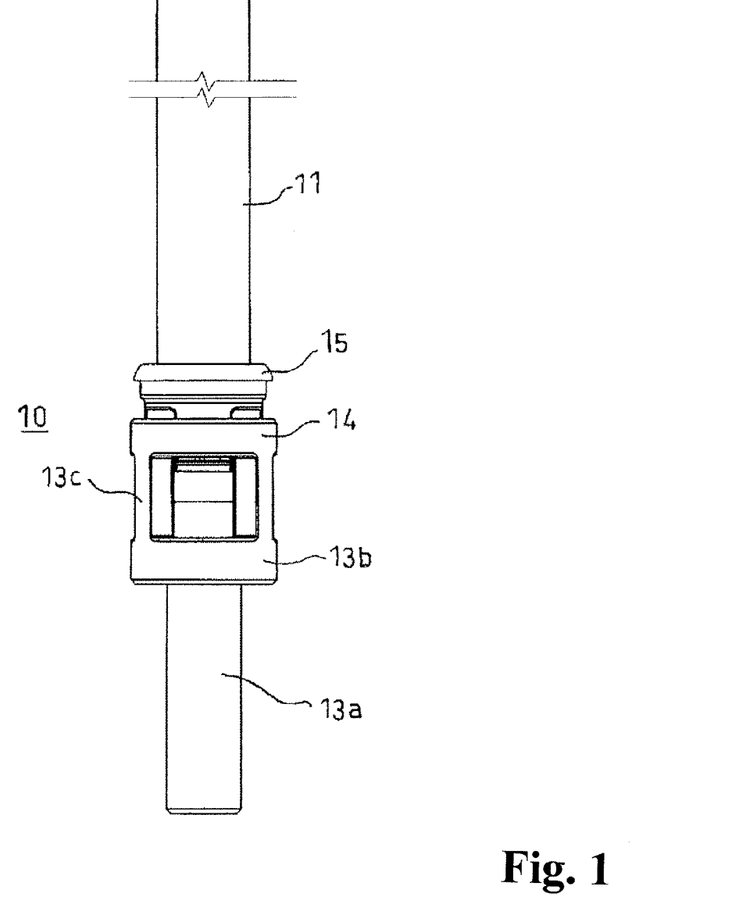
FIG. 1 is a front view of a connector which is one embodiment of the present invention.
Figure 2:
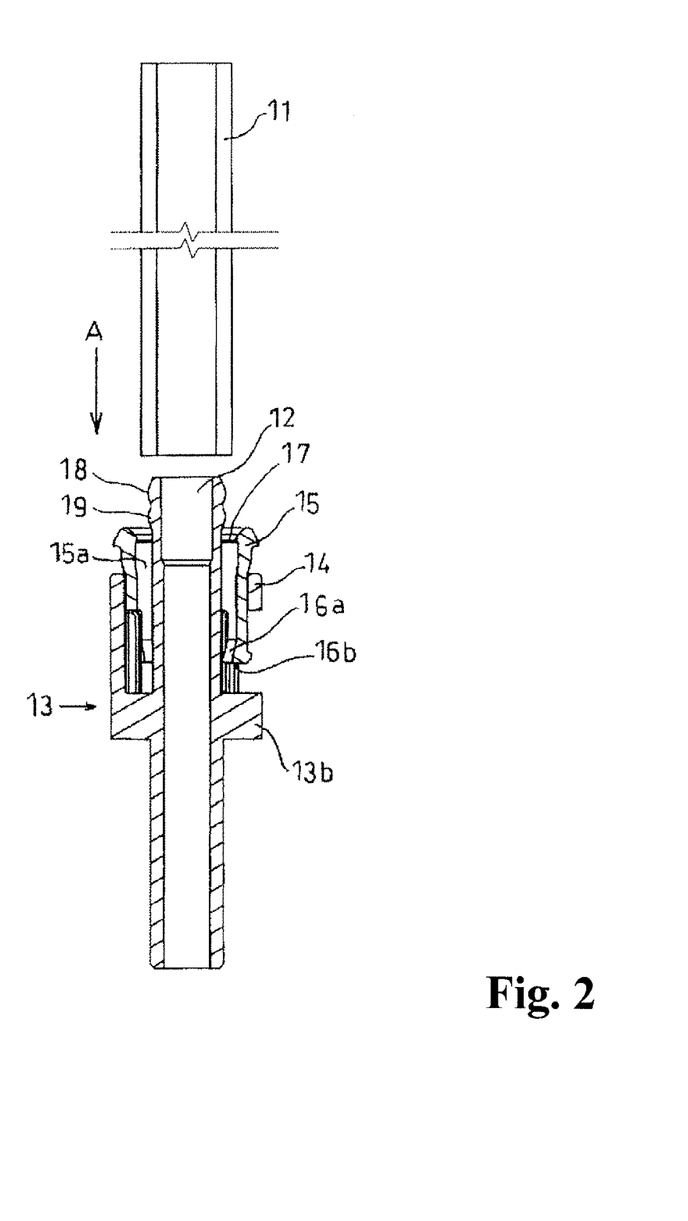
FIG. 2 is a vertical cross-sectional view showing a usage state of the connector.

Hereinafter, the present invention will be explained in detail based on drawings showing one embodiment. FIG. 1 is a front view of a connector which is one embodiment of the present invention, and FIG. 2 is a vertical cross-sectional view showing a usage state of the connector of the present invention. Here, a connector 10 of the present invention comprises a connector main body 13 including a mounting tube 12 for mounting a hose 11, and a lock member 15 loosely fitted in a guide member 14 of the connector main body 13 slidably in an axis line direction. The lock member 15 includes a claw member 16 provided to stand from an inner face in a direction of a hose mounted and facing thereto; and a projecting piece 17.

The connector main body 13 comprises a pipe portion 13a; a thick flange portion 13b; a plurality of support pillars 13c provided to stand in the axis line direction from the flange portion; the annular guide member 14 supported by the support pillars; and the mounting tube 12 continuously formed in the pipe portion 13a, on which the hose is mounted. The flange portion 13b is integrally formed on an outer circumference of the pipe portion 13a. The support pillars 13c and the guide member 14 are provided to be disposed around the mounting tube 12 having a predetermined distance from the mounting tube 12 in order to ensure a housing space for the lock member 15 and the hose 11. The mounting tube 12 includes an annular first projecting piece 18 and an annular second projecting piece 19 on an outer circumference near an end. The projecting piece 17 formed in the lock member 15 has a configuration positioned between the first projecting piece 18 and the second projecting piece 19 when the hose is locked.

Figure 3:
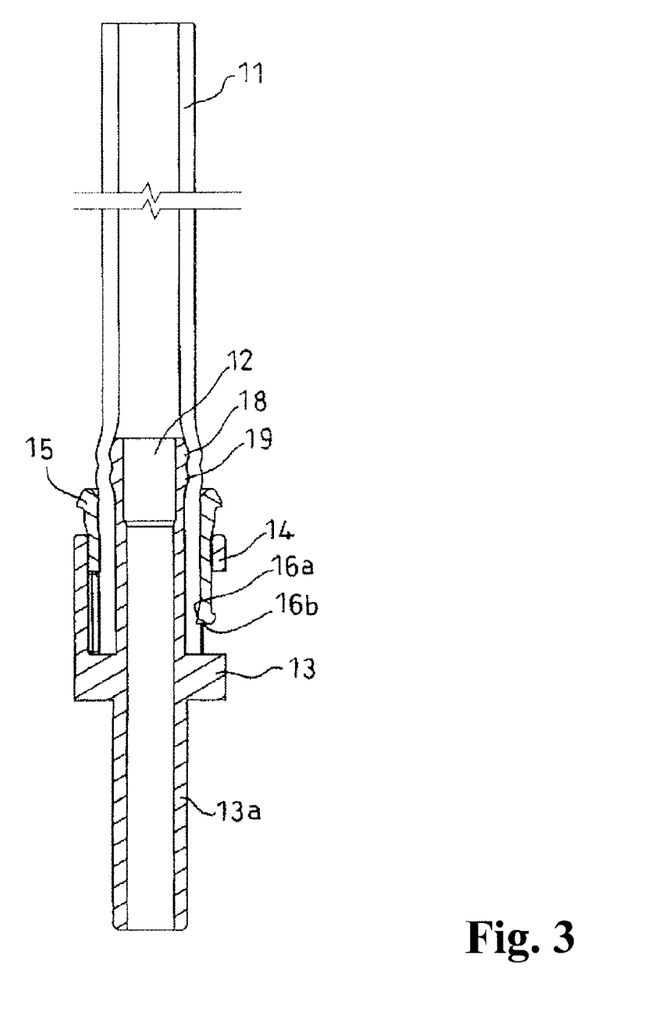
FIG. 3 is a vertical cross-sectional view showing the usage state of the connector.

The lock member 15 has approximately a cylinder shape, and includes the claw member 16 provided to stand from an inner wall face 15a in the direction of the hose mounted thereto, and the projecting piece 17. The claw member 16 is provided in a lower end of the lock member 15, and a circumference is notched to have a configuration which can be easily deformed elastically. Also, as shown in FIG. 2, FIG. 3, and the like, the claw member 16 is formed to have a wedge shape in cross-section by a gentle slope surface 16a and a horizontal surface 16b so as to have a configuration that faces little resistance at an insertion time of the hose, and bites into the hose at a pull-out time. The projecting piece 17 is formed on an inner side near an upper end of the lock member 15, and when the lock member 15 has risen, the projecting piece 17 is positioned between the first projecting piece 18 and the second projecting piece 19 formed in the mounting tube 12 so as to clamp the hose 11.

Next, a usage aspect of the connector 10 configured as mentioned above will be explained according to FIGS. 2 to 5. First, the hose 11 is inserted into the mounting tube 12 of the connector 10 until the hose 11 abuts against the flange portion 13b from an arrow A direction. At that time, the claw member 16 of the lock member 15 contacts an outer circumference of the hose. However, the claw member 16 elastically deforms in an outer circumferential direction, and has the gentle slope surface 16a so as to smoothly insert the hose 11 (see FIGS. 2 and 3).

Figure 4:
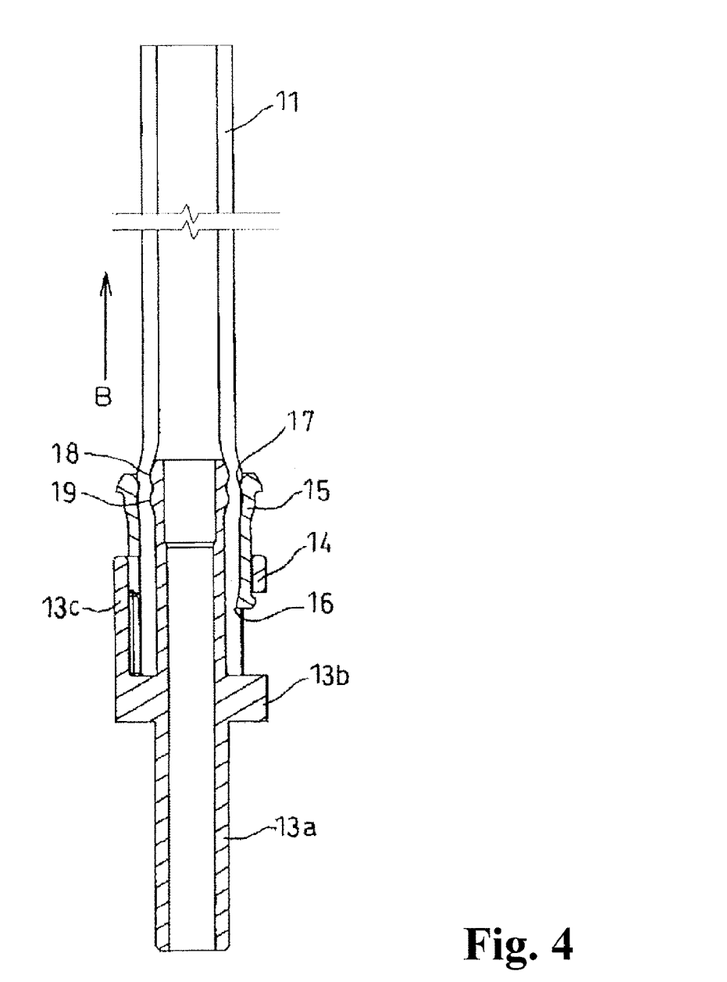
FIG. 4 is a vertical cross-sectional view showing the usage state of the connector.
Figure 5:
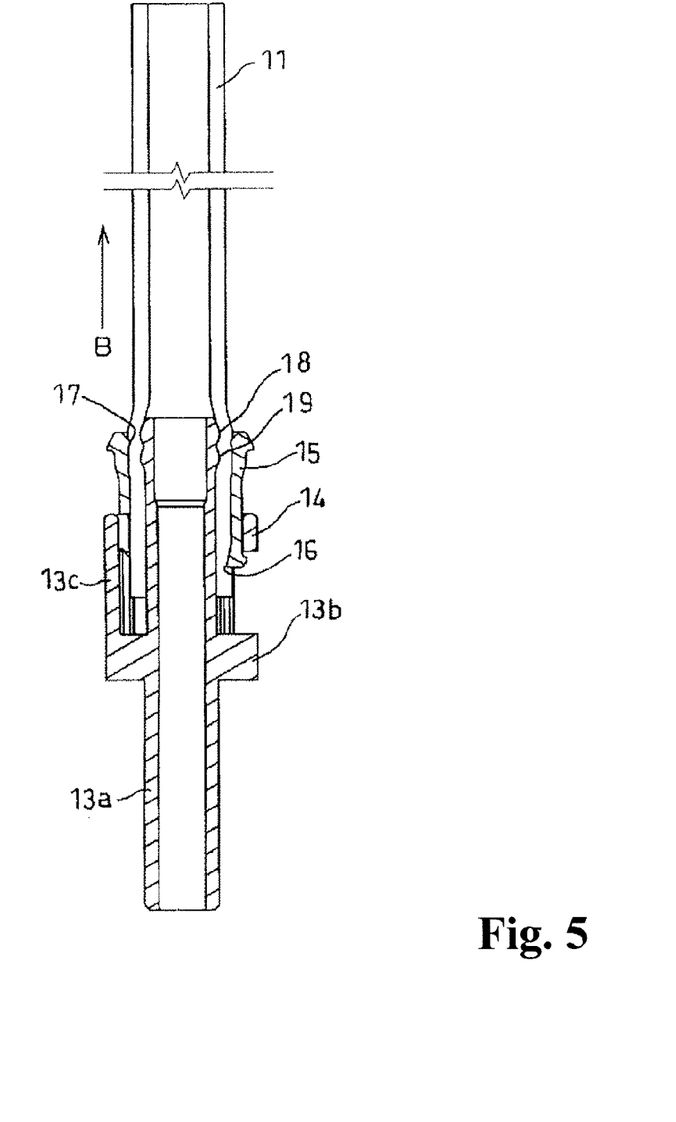
FIG. 5 is a vertical cross-sectional view showing the usage state of the connector.

After that, when the hose 11 or the lock member 15 is pulled in an arrow B direction, the claw member 16 bites into a hose surface by a wedge effect, and the projecting piece 17 of the risen lock member 15 is positioned between the first projecting piece 18 and the second projecting piece 19 of the mounting tube 12 so as to clamp the hose from front and back. FIG. 4 is a case wherein the lock member 15 has been pulled directly in the arrow B direction, and FIG. 5 is a case wherein the hose 11 has been pulled in the arrow B direction.

In this way, the connector of the present invention can form a reliable retainer by the claw member 16, the projecting piece 17, the first projecting piece 18, and the second projecting piece 19. Also, even if the hose has flexibility, an expansion of a diameter of the hose due to an inner pressure is controlled, so that the hose can be firmly fixed to the connector 10 and be sealed reliably. Moreover, even if the diameter of the hose has expanded due to the inner pressure, a high sealing performance can be ensured. Also, using a flexure of the hose, a feeling of moderation can be obtained.

Figure 6:
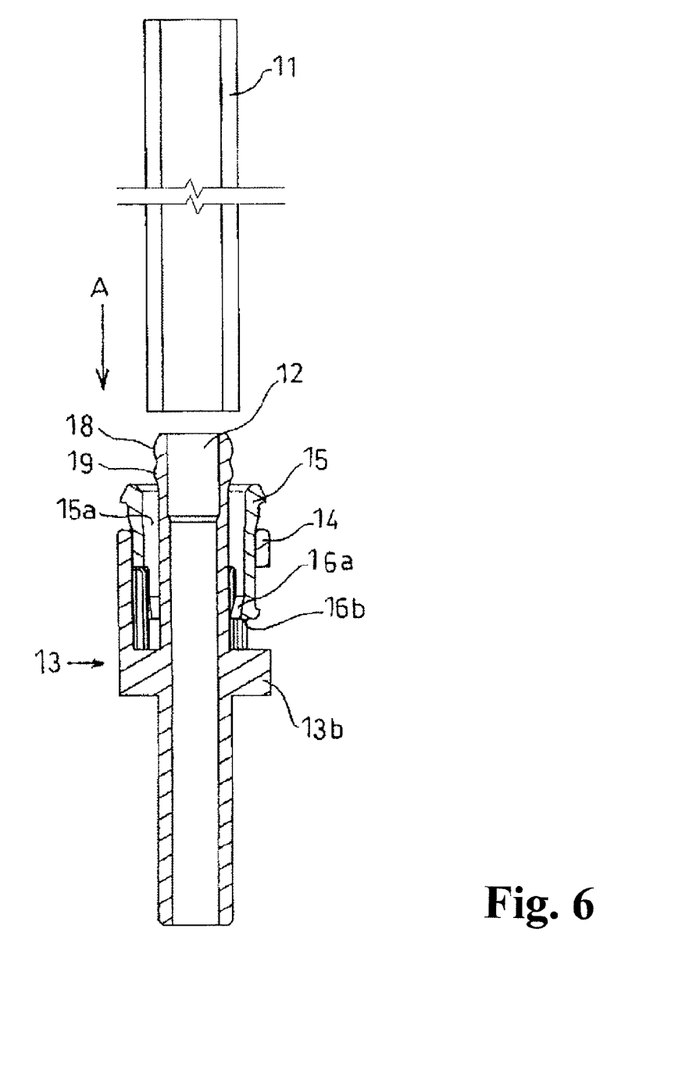
FIG. 6 is a vertical cross-sectional view showing a modified example of the connector according to the present invention.
Figure 7:
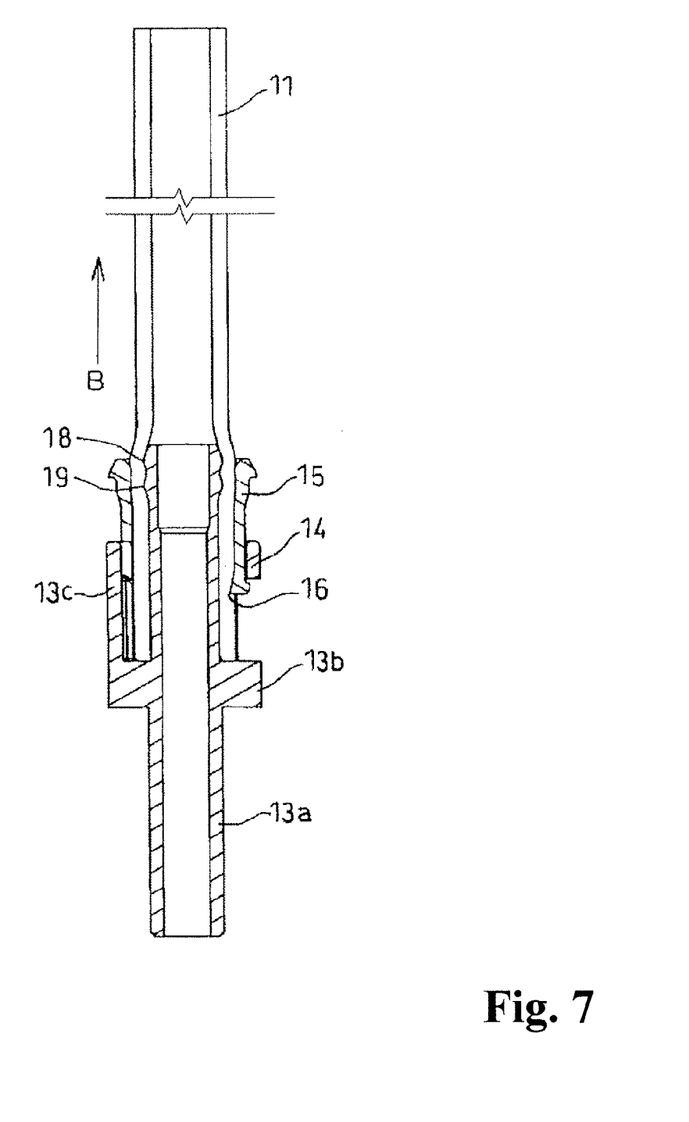
FIG. 7 is a vertical cross-sectional view showing the usage state of the connector.

FIG. 6 is a vertical cross-sectional view showing a modified example of the connector according to the present invention, and FIG. 7 is a vertical cross-sectional view showing the usage state of the connector of the present invention. In the present modified example, the lock member 15 has approximately a cylindrical shape, includes only the claw member 16 provided to stand from the inner wall face 15a in a direction of the hose mounted thereto, and does not include the projecting piece 17. Regarding another configuration, since it is the same as the above-mentioned example, the same reference numerals are assigned, and an explanation is omitted.

Even in a case configured as mentioned above, if the hose 11 or the lock member 15 is pulled in the arrow B direction, the claw member 16 bites the hose surface by the wedge effect so as to lock the hose. Also, the lock member 15 moves onto the first projecting piece 18 and the second projecting piece 19 of the mounting tube 12 so as to control the expansion of the diameter of the hose due to the inner pressure and to ensure a sealing performance. FIG. 7 is the case wherein the lock member 15 has been pulled directly in the arrow B direction. Even if the hose 11 is pulled directly in the arrow B direction, the hose 11 can be locked.

Figure 8:
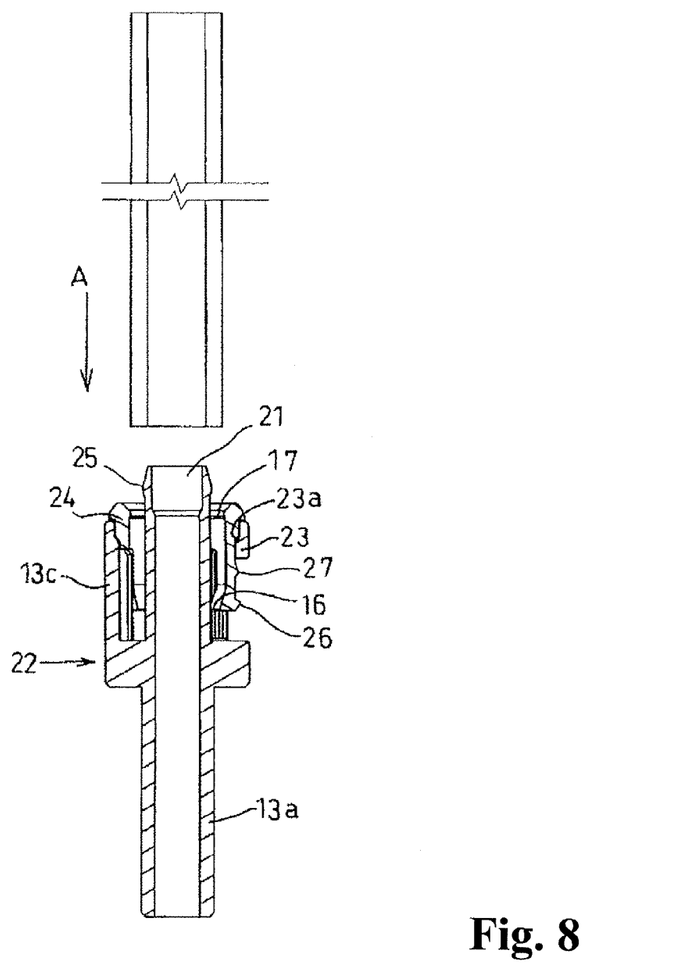
FIG. 8 is a vertical cross-sectional view showing the usage state of the connector which is another embodiment of the present invention.
Figure 9:
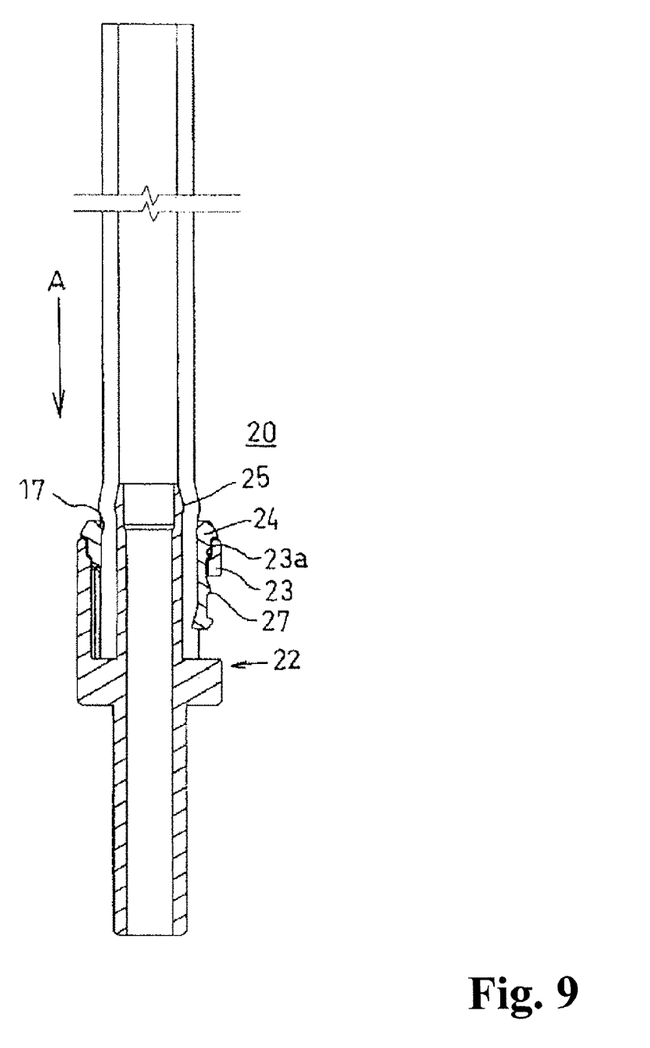
FIG. 9 is a vertical cross-sectional view showing the usage state of the connector.

FIGS. 8 to 9 are vertical cross-sectional views showing the usage state of the connector which is another embodiment of the present invention. In the present embodiment, a connector 20 comprises a connector main body 22 including a mounting tube 21 for mounting the hose 11; and a lock member 24 loosely fitted in a guide member 23 of the connector main body 22 slidably in the axis line direction. The lock member 24 includes the claw member 16 provided to stand from the inner wall in the direction of the hose mounted and facing thereto; and the projecting piece 17. Also, regarding the same portions as the first embodiment, the same reference numerals are assigned, and an explanation is omitted.

The connector main body 22 comprises the pipe portion 13a; the thick flange portion 13b; the plurality of support pillars 13c provided to stand in the axis line direction from the flange portion; the annular guide member 23 supported by the support pillars; and a mounting tube 21 continuously formed in the pipe portion 13a, on which the hose is mounted. The support pillars 13c and the guide member 23 are provided to be disposed around the mounting tube 21 having a predetermined distance in order to ensure a housing space for the lock member 24 and the hose 11. The mounting tube 21 includes an annular projecting piece 25 on an outer circumference near an end.

The guide member 23 includes a step portion 23a whose diameter changes on an inner circumference, and is formed to have a large inner diameter above the step portion 23a and a small inner diameter below the step portion 23a. Thereby, a second locking protrusion 27 formed on an outer circumference of the lock member 24 is held at the step portion 23a at a lock time. Incidentally, the second locking protrusion 27 may be held at a locked portion of the guide member 23 which does not have the step portion.

The lock member 24 comprises a locking protrusion 26 on a lower-end outer circumference, and the second locking protrusion 27 having a predetermined interval in the axis line direction. When the hose is locked, the second locking protrusion 27 is held at the step portion 23a of the guide member 23.

Next, a usage aspect of the connector 20 configured as mentioned above will be explained according to FIGS. 8 to 11. First, the hose 11 is inserted into the mounting tube 21 of the connector 20 up to a back in an arrow A direction. At that time, the claw member 16 of the lock member 24 contacts the outer circumference of the hose. However, the claw member 16 elastically deforms in the outer circumferential direction, and has the gentle slope surface so as to smoothly insert the hose 11 (see FIG. 9).

Figure 10:
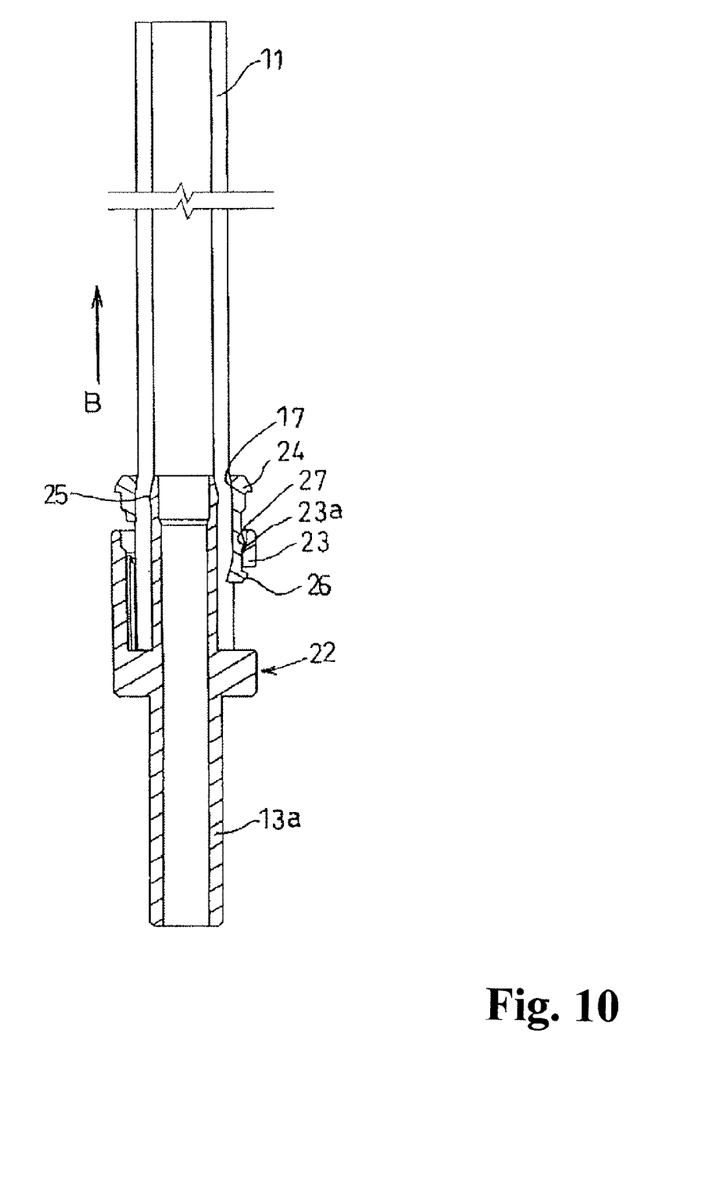
FIG. 10 is a vertical cross-sectional view showing the usage state of the connector.
Figure 11:
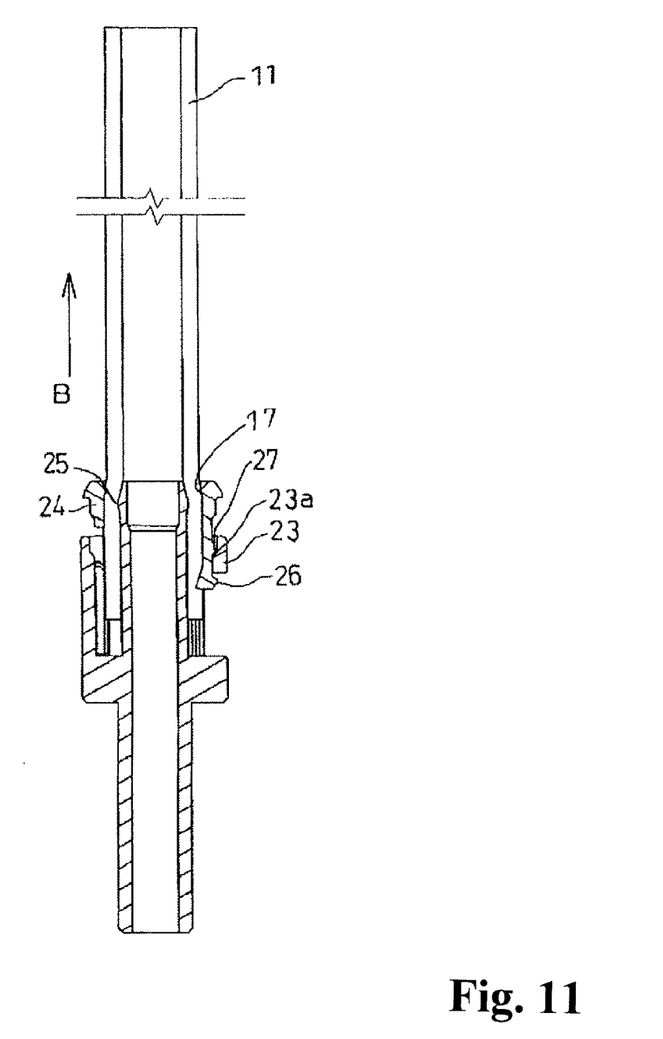
FIG. 11 is a vertical cross-sectional view showing the usage state of the connector.

After that, when the hose 11 or the lock member 24 is pulled in an arrow B direction, the claw member 16 bites the hose surface by the wedge effect, and the projecting piece 17 of the lock member 24 risen together with the hose is positioned in a hose insertion direction more than the projecting piece 25 of the mounting tube 21 so as to clamp the hose from front and back. FIG. 10 is a case wherein the lock member 24 has been pulled directly in the arrow B direction, and FIG. 11 is a case wherein the hose 11 has been pulled in the arrow B direction.

In this way, the connector of the present invention can form a reliable retainer by the claw member 16, the projecting piece 17, and the projecting piece 25. Also, the lock member 24 is fixed by the projecting piece 17, the projecting piece 25, the second locking protrusion 27, and the step portion 23a of the guide member 23 so as to have no possibility of descending. Also, the lock member 24 controls the expansion of the diameter of the hose due to the inner pressure, so that the hose can be firmly fixed and be sealed reliably. Moreover, even if the diameter of the hose has expanded due to the inner pressure, the high sealing performance can be ensured.

Furthermore, the present invention is not limited to the examples described hereinabove, and can be variously modified based on claims of the present invention.

All contents of the specification, claims, drawings, and abstract of Japanese Patent Application No. 2011-106902 filed on May 12, 2011 are cited in their entireties herein and are incorporated as a disclosure of the specification of the present invention.

What is claimed is:

1. A connector, comprising:
a single piece, integrally formed connector main body including an annular guide member, at least one window adjacent the annular guide member, and a mounting tube for mounting a hose, the mounting tube formed inside the guide member and extending beyond a front end of the guide member in an axial direction, the mounting tube having at least one projecting piece formed on an outer circumference at a front side thereof and beyond the front end of the guide member; and a lock member disposed between the guide member and the mounting tube, and loosely fitted in the guide member of the connector main body slidably in the axial direction, the lock member including a claw member projecting from an inner wall face of the lock member toward the mounting tube, wherein the lock member and the connector main body are configured so that after the hose is mounted over the mounting tube inside the lock member, when the hose or the lock member is moved in a direction from a rear side with respect to the guide member toward the front side, the claw member is urged by the guide member toward the hose to lock the hose between the claw member and the mounting tube at the rear side and the hose is clamped between the at least one projecting piece and the lock member at the front side so as to fix the hose;

wherein the lock member includes a locking protrusion on an outer circumference that interacts with the at least one window.

2. A connector according to claim 1, wherein the mounting tube includes a plurality of projecting pieces on the outer circumference, and the projecting piece formed on the inner wall face of the lock member is positioned between the plurality of projecting pieces so as to clamp and fix the hose.

3. A connector according to claim 2, wherein the lock member includes a further locking protrusion on an outer circumference, and the further locking protrusion is held at a locked portion of the guide member so as to prevent positional misalignment of the lock member.

4. A connector according to claim 1, wherein the lock member has a circular shape and includes two notches to define the claw member therebetween on a rear portion of the lock member to elastically deform the claw member.

5. A connector according to claim 4, wherein the connector main body further comprises a pipe portion formed on a rear portion of the connector main body for mounting another hose and communicating with the mounting tube, the at least one window defined by a flange portion formed on an outer circumference of the pipe portion and a support pillar connecting the guide member to the flange portion in the axial direction.

* * * * *